United States Patent [19]

Kok

[11] 3,803,417
[45] Apr. 9, 1974

[54] X-RAY APPARATUS FOR HEART CATHETERIZATION AND OTHER PROCEDURES

[75] Inventor: Pieter W. Kok, Trumbull, Conn.

[73] Assignee: U.S. Philips Corporation, New York, N.Y.

[22] Filed: Mar. 26, 1973

[21] Appl. No.: 344,635

Related U.S. Application Data

[63] Continuation of Ser. No. 142,999, May 13, 1971, abandoned.

[52] U.S. Cl.................. 250/447, 250/490, 248/123
[51] Int. Cl. .......................................... G01n 21/00
[58] Field of Search.................. 248/123, 162, 297; 250/447, 320, 321, 322, 323, 490, 491

[56] References Cited
UNITED STATES PATENTS

| | | | |
|---|---|---|---|
| 3,659,099 | 4/1972 | Bertheau............................ | 250/490 |
| 1,530,063 | 3/1925 | Tichy................................. | 248/123 |
| 911,935 | 1/1909 | Baumwart.......................... | 248/123 |

Primary Examiner—James W. Lawrence
Assistant Examiner—Harold A. Dixon
Attorney, Agent, or Firm—Frank R. Trifari

[57] ABSTRACT

Apparatus for supporting and selectively moving an x-ray tube and image intensifier assembly in longitudinal, lateral, vertical and rotary directions, and for establishing a plane in a selected position and orientation, within which a scanning motion of the x-ray assembly can be limited; the assembly is counterbalanced as regards vertical movement, to require only a nominal force for manual operation, and electromagnetic locks are provided to selectively restrict movement of the assembly in any and all directions.

13 Claims, 11 Drawing Figures

INVENTOR.
PIETER W. KOK

INVENTOR.
PIETER W. KOK

AGENT

INVENTOR.
PIETER W. KOK

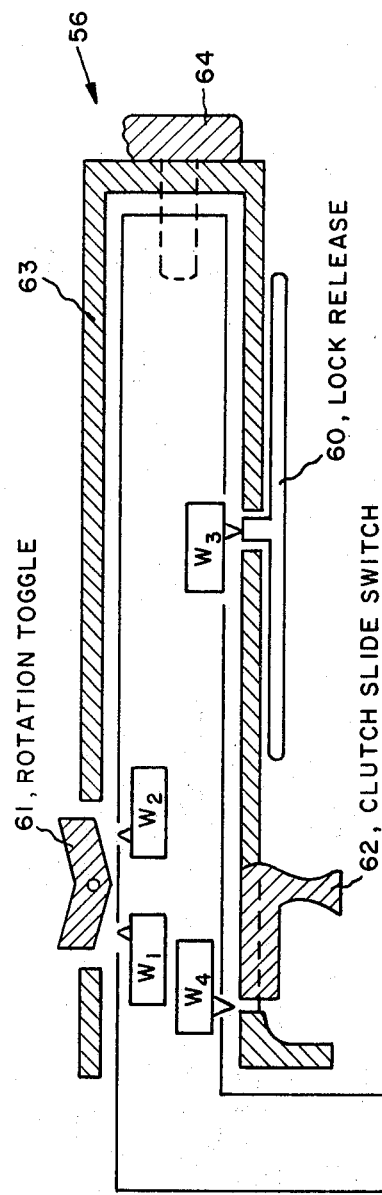
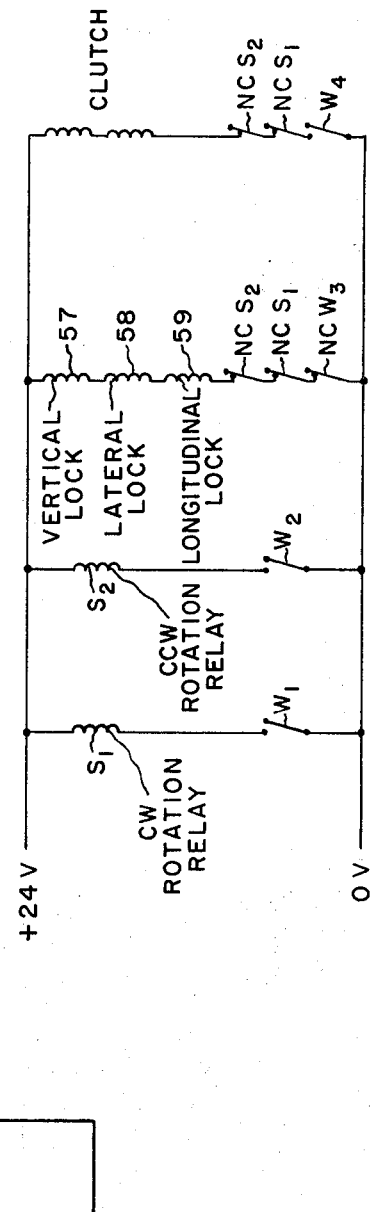

X-RAY APPARATUS FOR HEART CATHETERIZATION AND OTHER PROCEDURES

This is a continuation of application Ser. No. 142,999, filed May 13, 1971, now abandoned.

BACKGROUND OF THE INVENTION

The present invention is in the field of medical x-ray treatment and examination, and particularly the field of heart catheterization tables and related apparatus for supporting and moving an x-ray tube and image intensifier assembly relative to a patient, film changer or other x-ray detector. In past and present heart catheterization procedures one common technique for obtaining the desired projection angle of the x-ray beam relative to the patient involves rotation of the patient and/or the table supporting him. This has numerous drawbacks including inconvenience to the patient and medical staff, the difficulty in supporting a patient in unnatural positions, and certain danger created by moving a patient to whom various items of equipment are attached. Also, such movement of a patient requires special precautions, which consume time and effort of the attending staff, and this keeps the operating room and equipment in use for a considerable time, which precludes its use for other patients.

In view of the great increase in heart surgery, including pacemaker and artificial heart-pump implants, heart transplants, and other investigatory and corrective surgery, there is a very significant increase in the use of heart catheterization procedures and the x-ray equipment required.

In the course of a typical heart catheterization procedure it is necessary to translate the x-ray beam vertically and horizontally to reach the desired location, and also to angulate or rotate the beam between a vertical orientation and about 60° on either side of vertical, or further rotation; then the x-ray beam is moved longitudinally for scanning from the patient's head down to his diaphragm while the catheter is inserted and manipulated. For causing the x-ray support apparatus to move according to the above-described manner, electrical drive systems have been used to some extent with or in place of manually-operable systems; however, neither of these systems has been totally satisfactory as regards control or flexibility. The electrical drives tend to over-travel, or to move faster or slower than the operator might wish at a given instant, and the manual systems which are generally counter-weighted or counter-balanced with springs are quite heavy and consequently fatiguing to an operator and/or too cumbersome to ever be moved with the speed, flexibility and control desired. Furthermore the manipulation of these controls is distractive to the operator whose close attention is required for the catheterization.

After the cardiologist has positioned the x-ray tube and image intensifier assembly vertically, longitudinally, and laterally, and also angularly relative to a patient, he seeks to move the beam in a plane perpendicular to the axis of the beam, and to maintain this orientation of the beam. Since prior art supporting apparatus typically has been designed to provide freedom of motion in all the directions mentioned above, and because of the momentum due to considerable weight of the components, it has been found quite difficult, fatiguing and unfeasible to attempt to scan within a plane normal to the x-ray beam axis, while simultaneously maintaining the x-ray tube assembly in the finally selected orientation and distance from the patient.

Particularly regarding delicate heart catheterization procedure, in contrast to simple fluoroscopy examination, the x-ray tube assembly should be movable with controlled precision and relative ease. The drawbacks of prior art apparatus discussed above have precluded this equipment from providing optimum or even satisfactory movement and control, and it is in this area that the present invention provides very significant improvements with novel structure and features.

SUMMARY OF THE INVENTION

The new invention overcomes all the drawbacks described, and thus provides the precision and controlled motion that is desired of the x-ray tube and image intensifier assembly. A yoke carrying the tube and intensifier has a horizontally-extending arm that is supported, rotatably by a first frame, which frame is adapted to be moved vertically, longitudinally, and transversely while carrying the x-ray assembly. After the x-ray assembly has been placed in its selected position and orientation relative to the base and the patient, the apparatus supporting the x-ray assembly is locked from further angular movement, thus permitting the assembly to be moved only in a plane normal to the beam axis; movement in such a plane has vector representation of the resultants of both vertical and transverse vectors. With the apparatus locked as described, movement of the x-ray assembly is limited to the selected scanning plane regardless of the direction of the force applied, and with no exertion required to keep the assembly within this scanning plane during traversing.

In a preferred embodiment the force required for manual operation of the apparatus within its various limits of motion, is maintained at five pounds maximum, regardless of the direction of motion. This is achieved with a counter-balancing system of springs that provide a substantially constant force to the vertically-movable carriage assembly of the apparatus, using linkages which cause only a small change of length of the springs, while the vertical frame transverses a considerably greater distance.

The feature of the invention for establishing a plane of motion in fixed position and orientation, is a clutch mechanism operable with a system of carriages or frames. The x-ray tube and image intensifier assembly is carried by a first frame which is rotatable and vertically movable on a second frame; also the first frame is counter-balanced to provide stability in any vertical position and to require said maximum of only five pounds break-away force.

The second frame, carrying the first frame and x-ray assembly, is laterally movable on and carried by a third frame, which is longitudinally movable on a base. By applying force to the x-ray assembly in longitudinal, lateral, and/or vertical directions, the frames movable in the direction of force, in addition to the x-ray assembly, will be moved in the corresponding directions, and more particularly in the resultant direction of force as determined by the vector components of the applied forces. Also, at any position, the x-ray assembly can be rotated or angulated relative to the first frame, and thus also relative to the rest of the apparatus and the patient.

A locking means such as a remote-control electromagnet, is provided on each frame for fixing its position relative to the adjacent frame or base on which it is movably carried. Each magnet can be secured to either of the surfaces of each pair of adjacent relatively movable surfaces of said frame members, with each magnet energizably movable surfaces of said frame members, with each magnet energizable to lock onto the second surface of each of said pairs.

The clutch mechanism is operable for maintaining the position and orientation of a plane of motion that has been established for the x-ray assembly, after the vertical and lateral carriages are moved to position the x-ray tube adjacent the area of the patient to be examined. The x-ray tube and image intensifier respectively are carried by spaced arms of a yoke, with the end of the yoke remote from these arms formed as the shaft that engages the first, vertical frame. This arm extends through the frame to engage a portion of the third, longitudinal-moving frame where the remote end of the shaft becomes a component of the clutch mechanism. A linear member or rod parallel to said vertical surface is translatable and pivotable relative to this surface, and the remote end of the yoke shaft engages the rod for movement axially therealong.

In operation of this clutch mechanism, the linear member or rod is locked in any selected angulation; at such time the end of the yoke shaft engaged to the rod can have translational movement only along the axis of the rod. With this limitation on the end of the yoke shaft, it follows that the yoke and x-ray tube and image intensifier also can move only in translation, thus defining a plane of scanning motion. With the vertical, lateral, and longitudinal frames freely movable relative to each other, the x-ray assembly is movable transversely within the established scanning plane, in any transverse direction or resultant thereof, while being maintained at the selected angulation and distance relative to the patient. A preferred embodiment of the new invention is described below, with reference to the drawings.

BRIEF DESCRIPTION OF THE DRAWINGS

FIG. 9 is a sectional view of the control handle.

FIG. 10 is the electrical circuit for the control handle.

DESCRIPTION OF THE PREFERRED EMBODIMENT

Figure 1:
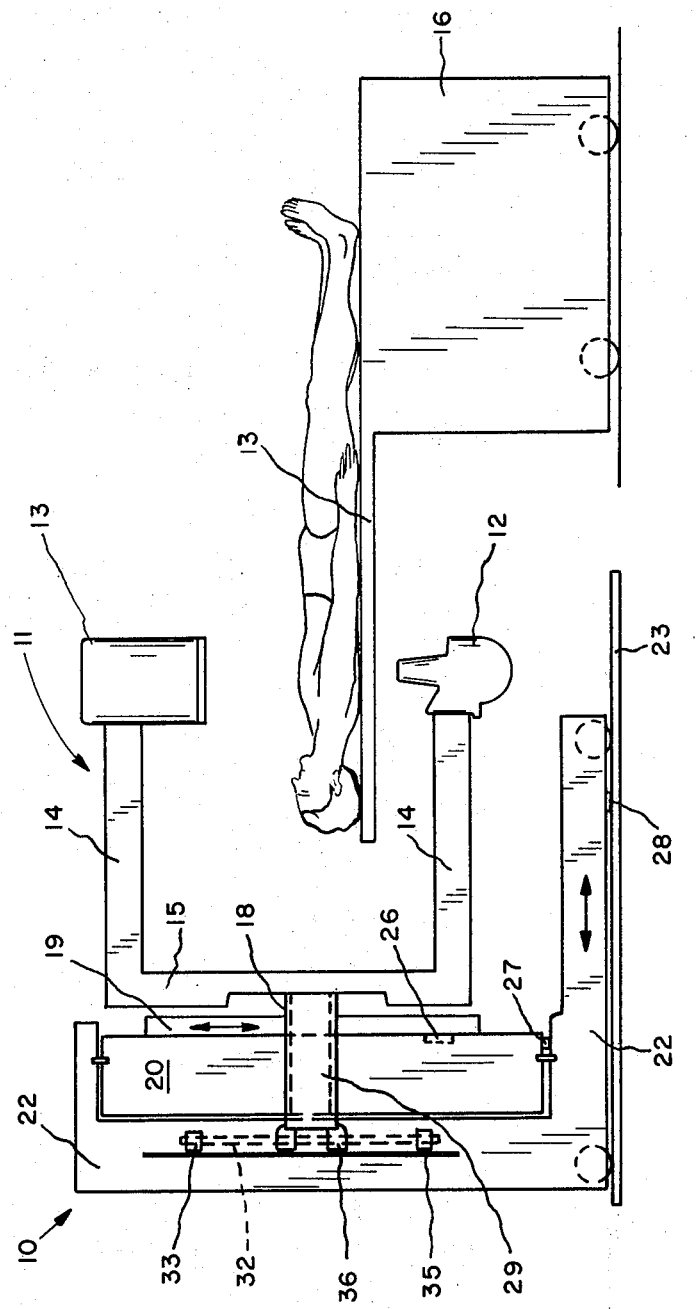
FIG. 1 is an elevation view of a preferred embodiment of the new invention with a patient-supporting table.

FIG. 1 shows the apparatus 10 of the new invention for supporting the assembly 11 of an x-ray tube 12 and image intensifier 13, respectively carried by arms 14 of yoke 15. Adjacent this apparatus is placed a patient-supporting table 16 with an extended platform 17 whereby a patient can be positioned between the x-ray tube and image intensifier for whatever medical procedure is to follow. Most of the basic components of apparatus 10 are shown in both FIGS. 1 and 2; yoke 15 with the x-ray assembly secured thereto, is rotatable via bearing 18 within a first frame or carriage 19 which is vertically movable on a second frame 20. The sliding engagement between the first and second frames, 19 and 20, is represented by guide tracks or grooves 21, with frame 19 being secured to 20 and also counterbalanced (FIGS. 3, 4, 5) for any vertical movement relative to frame 20. A third frame 22 is movable longitudinally on base 23 via guide tracks 24; frame 22 also supports and carries frame 20 for transverse movement thereon via guide tracks 25.

The three frames 19, 20, and 22 are freely movable relative to each other and relative to the base 23, such that a person can apply forces to the yoke and attached x-ray assembly, in longitudinal, transverse and/or vertical directions, and cause the x-ray assembly to move in a direction that is the vector resultant of the applied forces. Between frame 19 and 20 is an electromagnet 26 which can be energized to lock these two frames from further relative movement, or more particularly to restrict the x-ray assembly from any vertical movement. A similar electromagnet 27 is situated between transverse frame 20 and longitudinal frame 22; and still another similar electromagnet 28 is disposed between the base 23 and frame 22. These magnetic locking means can be actuated separately or jointly, and preferably they are controlled by a group of switches that an operator can adjust or manipulate with one hand while he is standing near the apparatus. These switches may be located together on a single handle as described in later paragraphs.

Figure 8:
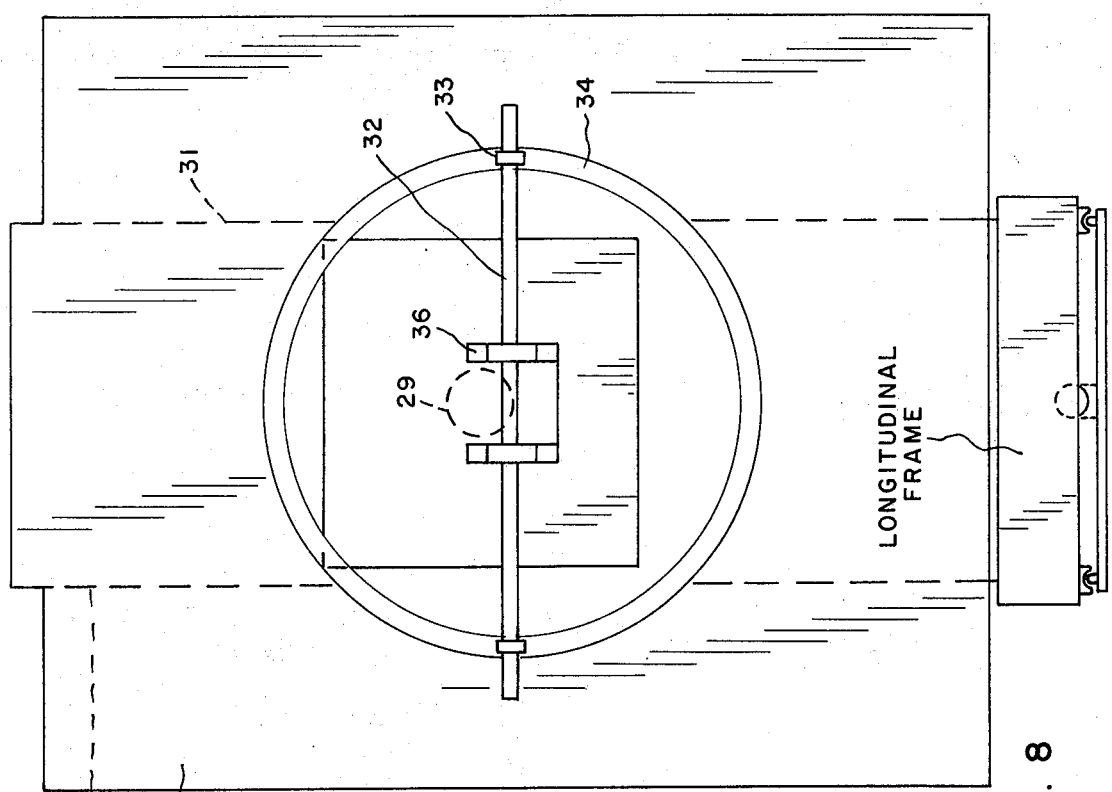
FIG. 8 is a partial front elevation view of the clutch assembly.

From yoke 15 a rotatable shaft 29 extends through bearing 18 on frame 19 to the clutch mechanism 30 at the rear wall 31 of frame 22. The clutch mechanism includes a rod 32 having its ends mounted in bearing collars 33, which permit relative axial motion. In surface 31 is a generally circular track 34 in which collars 33 are guided whenever rod 32 is angulated or translated vertically or laterally, during which time the rod axis is maintained parallel to surface 31. At the base of each collar 33 or elsewhere on the rod is an electromagnet 35, which when actuated, locks the rod in any selected and fixed angular position in track 34. Operative with the rod and axially slidable thereon is collar or coupling 36 rigidly secured to the end of shaft 29, and rotatable and always movable with this shaft. An elevation view of the clutch mechanism is shown in FIG. 8 with rod 32 horizontal and collars 33 in the track 34.

Figure 2:
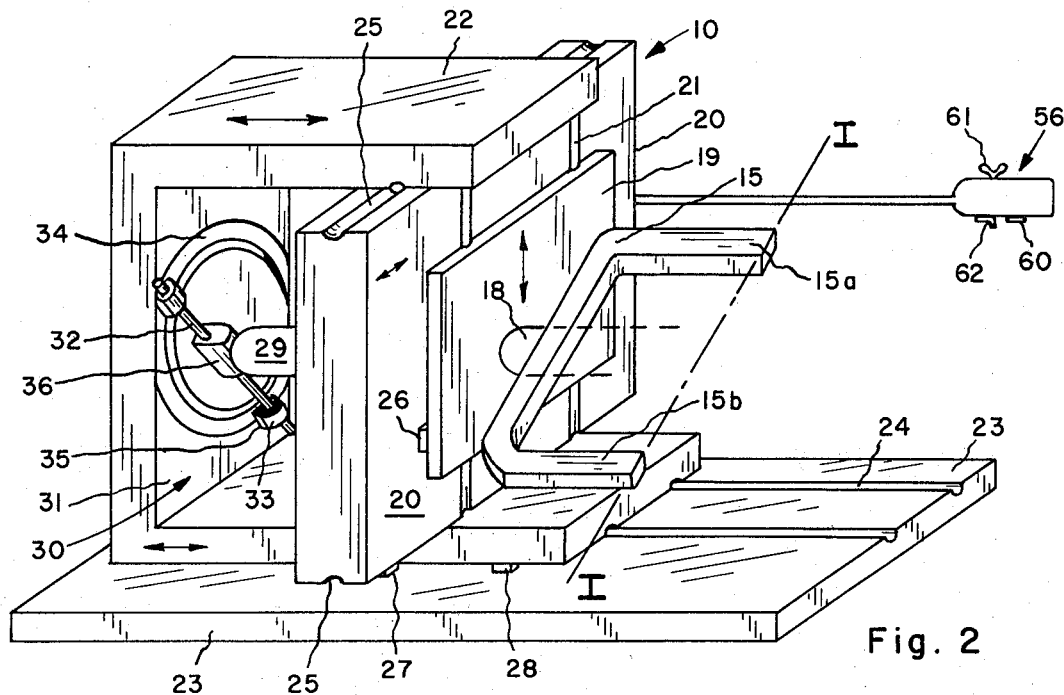
FIG. 2 is a diagrammatic perspective elevation view of the invention without the patient-supporting table.

The operation of the clutch is as follows, with reference to FIGS. 2 and 8. Movement is initiated with the yoke 15 and x-ray assembly 11 carried by the yoke. When the yoke and assembly are urged vertically upward, for example, frame 19 rises, as does shaft 29 and its collar member 36. If the rod 32 happens to be horizontal (as in FIG. 8, and as would be the case when the yoke is vertical), then the shaft 29 and rod 32 coupled thereto would remain in their initial angular orientation, and collars 33 guided by track 34, would move closer together as rod 32 moved upward. If, on the other hand, rod 32 were vertically oriented, then upward vertical movement of the yoke and x-ray assembly would result in coupling 36 sliding axially along the rod 32. When the yoke is moved in some angular direction which is a vector resultant of vertical and lateral components, the clutch merely accommodates both vectors and becomes translated and rotated accordingly, with coupling 36 sliding on rod 32 as necessary. Thus far the description of the clutch operation concerned its disengaged condition, when its components were freely movable in different directions. Engagement of the clutch is accomplished by energizing electromagnets 35 which lock rod 32 in a fixed angular orientation. This orientation is determined and established by the operator of the apparatus or the cardiologist, who moves the x-ray assembly vertically, laterally, and rotatably until the x-ray beam is directed to traverse a patient at the desired location and angle, with the patient properly located intermediate the x-ray tube and image intensifier. When the x-ray assembly is thus orientated, magnets 35 are actuated to lock rod 32. Now, coupling 36 is still axially slidable on rod 32, and consequently movement of the assembly, as permitted along the rod, defines a plane which becomes the x-ray scanning plane.

Prior to locking the clutch, when the x-ray assembly is positioned and oriented as desired, with the x-ray beam directed along the resulting x-ray axis, which axis is along a line I—I between the yoke arms 15a and 15b are perpendicular to the axis of rod 32 and coupling 36. With the geometry of the structure as described, locking the clutch allows the assembly to be movable only in said scanning plane which is perpendicular to the x-ray axis.

Assume, for example, that the clutch is locked and the scanning plane is at some angle between horizontal and vertical. Even if the x-ray assembly is urged laterally (horizontally) or vertically, it can move only within the angled scanning plane; thus any movement at such angle is a resultant of both horizontal and lateral vectors of motion. Consequently force applied to the assembly will be automatically resolved into lateral and vertical components which will cause frame 20 to move laterally and frame 19 to move vertically and simultaneously with frame 20, while the coupling 36 slides on rod 32, and the x-ray beam is maintained normal to the scanning plane.

Movement of the x-ray assembly within the scanning plane also includes longitudinal movement, which is provided by the freedom of frame 22 to move relative to base 23, and while moving to carry the remaining lateral and vertical frames, clutch mechanism and x-ray assembly; thus while maintaining the x-ray beam normal to the scanning plane and freely movable transversely in the plane, the beam can be also moved lengthwise relative to the patient. The scanning plane can be represented by any plane normal to the x-ray beam; however practically it is a plane traversing the patient at a depth within the body that is of concern for the particular procedure. When this scanning plane is established, it is situated at some distance intermediate the x-ray tube and image intensifier; later when the x-ray assembly is moved to cause the x-ray beam to traverse the scanning plane, the x-ray tube is always maintained at the same fixed distance from the plane. At any time any or all of the electromagnets can be actuated to cause additional restrictions of movement, and of course the clutch can be disengaged to permit establishment of a new scanning plane.

Figure 3:
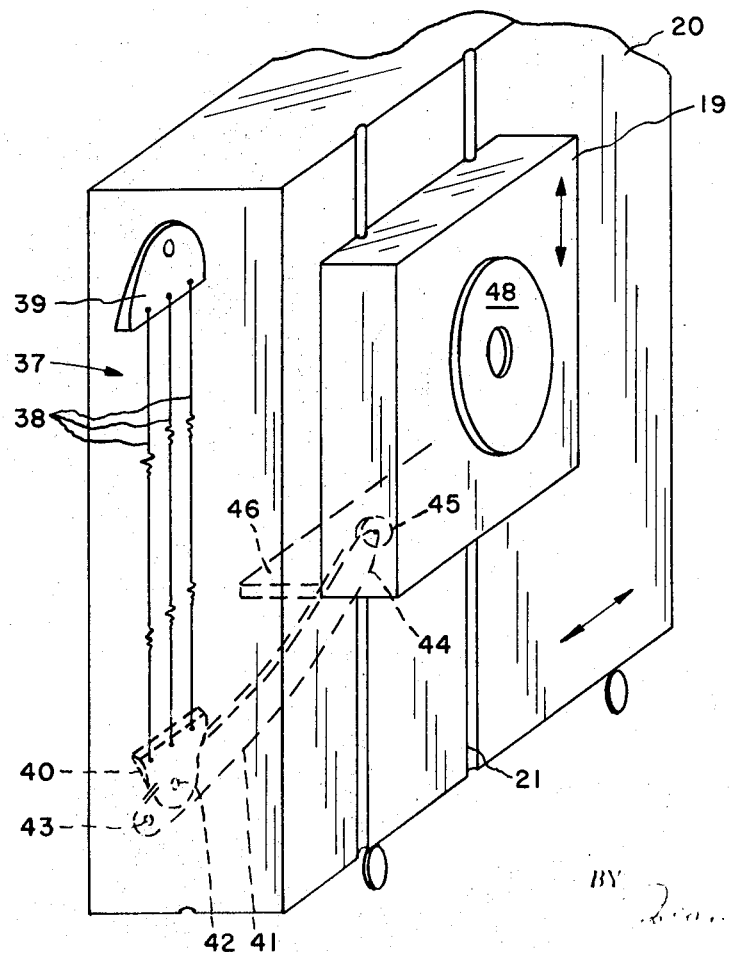
FIG. 3 is a diagrammatic perspective elevation view of the vertical frame and counter-balance assembly of FIG. 2.
Figure 4:
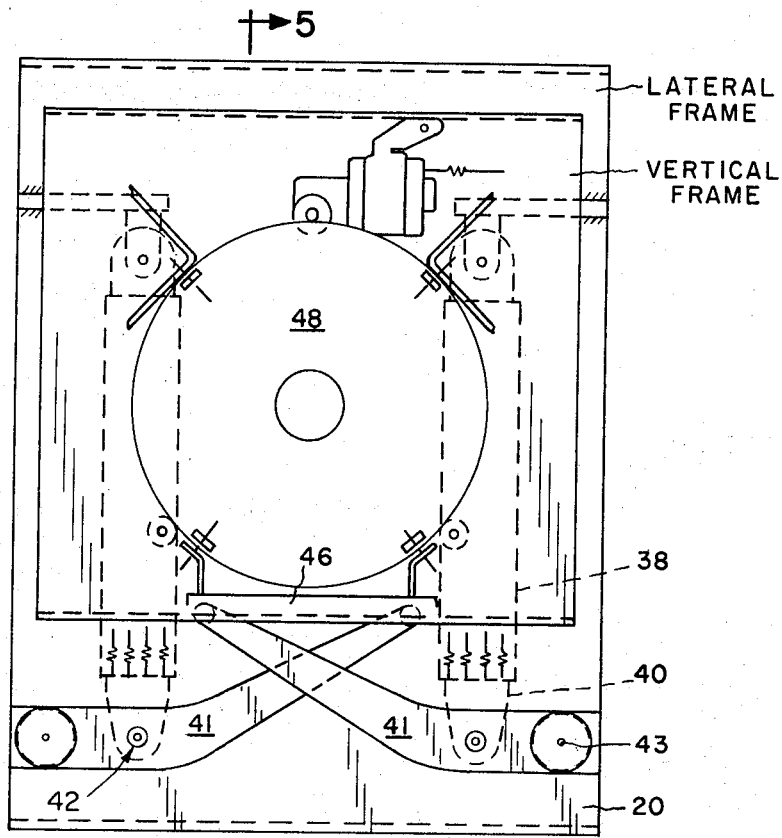
FIGS. 4 and 4a are partial front elevation views of FIG. 3.
Figure 5:
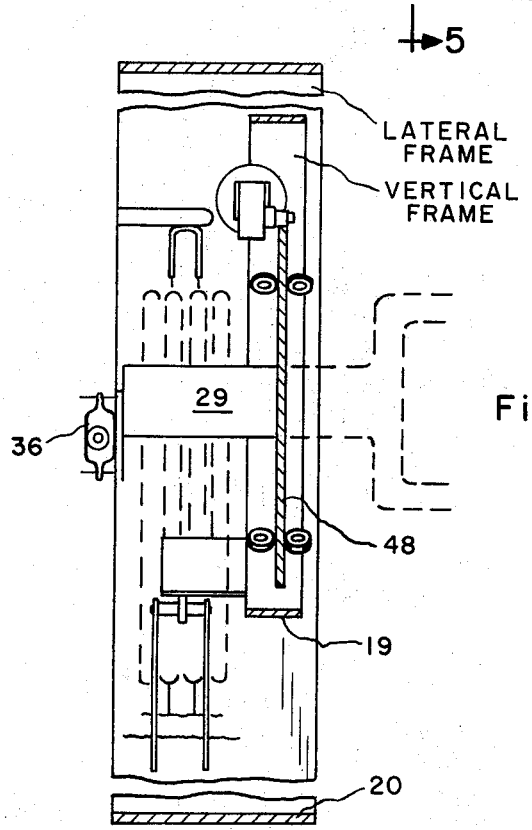
FIG. 5 is a side elevation view of FIG. 4.

The sub-assembly 37 for counter-balancing the vertically-moving, first frame 19 is shown in FIGS. 3, 4, and 5. Tension springs 38 each have a top end secured to upper bracket 39 that is pinned to frame 20 and a bottom end secured to lower bracket 40 that is pivotally connected to lever 41 by pin 42. The lever has its own pivot point 43 pinned to lateral frame 20 and a remote end 44 with a roller 45 that engages ledge 46 of vertical frame 19.

An important feature of this spring counter-balance is a substantially constant lifting force applied by the springs to the ledge 46, tending to equalize the downward force of the vertical frame 19 and the yoke and x-ray assembly it carries. As shown in FIG. 4, pin 42 is at the effective point of application of the spring force upon lever 41, and this force acts at a distance $x$ from the lever's pivot point 43. Roller 45 is at a distance $y$ from pivot 43, which represents the moment arm on which the downward force of the x-ray assembly is applied.

Figure 4A:
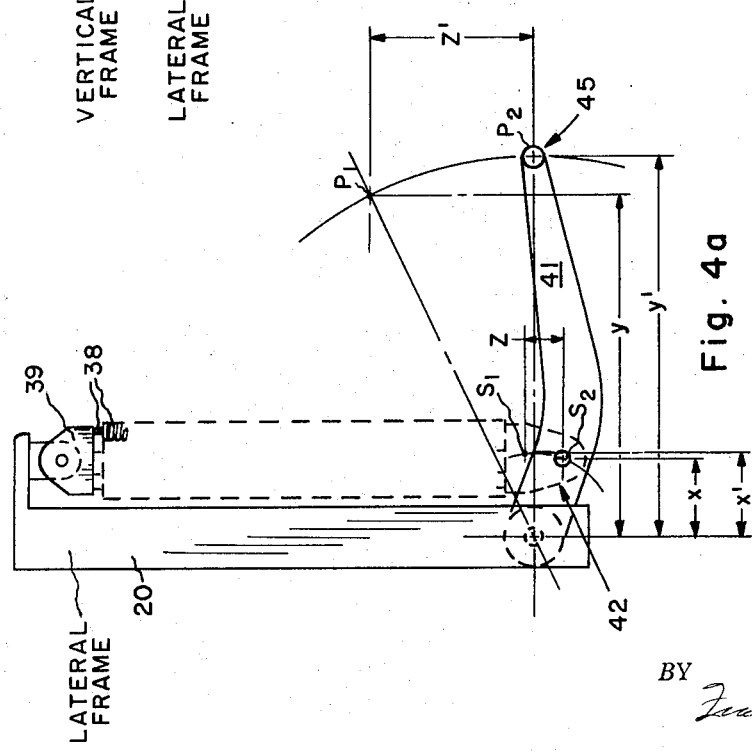

As arm 41 descends due to a lowering of the x-ray assembly, roller 45 follows an arcuate path from points $P_1$ to $P_2$, for example, where the moment arm increases from $y$ to $y'$; also spring 38 is stretched slightly with its lower point 42 moving distance $z$ from $s$ to $s'$ which is much less than the distance $z'$ moved by the x-ray assembly. The geometry of this sub-assembly provides a number of useful features; increased tension in the spring due to stretching when the x-ray assembly is lowered, and is at least partially compensated by the increased length of the moment arm ($y' - y'$) on which the assembly weight acts. Secondly, the assembly can be moved a considerable distance with only nominal further stretching of the springs (compare $z'$ to $z$), such that minimal space is required to house the springs, and spring design and selection is somewhat easier. In the embodiment shown in FIG. 4 each of the two levers 41 is acted upon by a bundle of sixteen spring units, each unit comprising an outer coil spring surrounding an inner coil spring (FIG. 4a).

Figure 6:
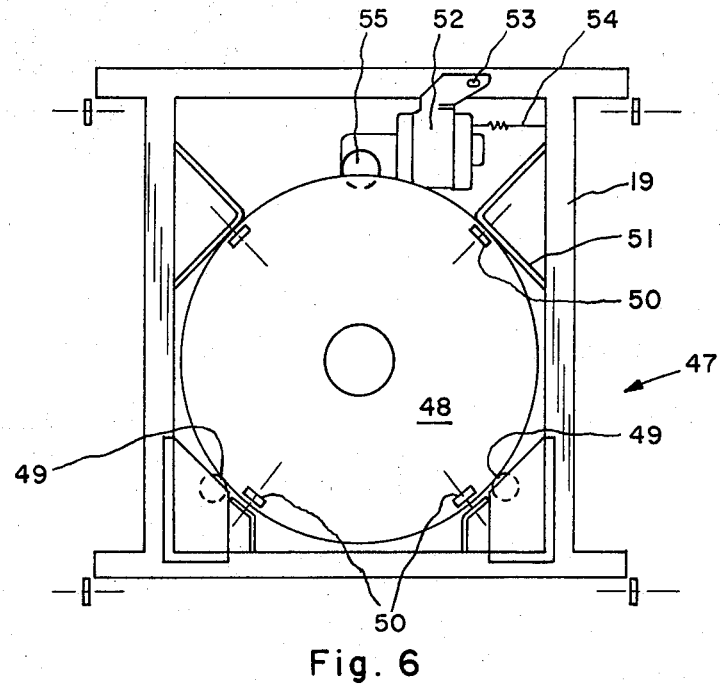
FIG. 6 is front elevation views of the vertical frame and rotary assembly.
Figure 7:
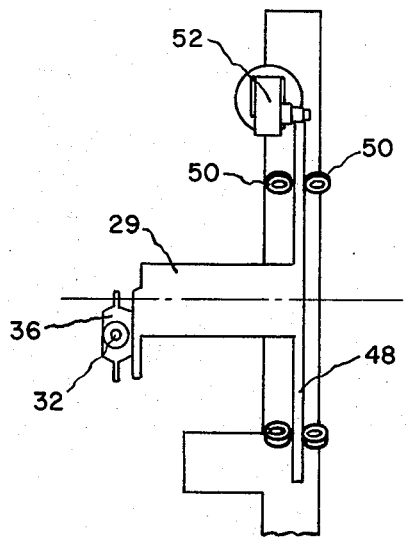
FIG. 7 is a side elevation view, partially in section of FIG. 6.

FIGS. 4, 5, 6 and 7 show details of the sub-assembly 47 carried by vertical frame 19 providing rotary motion or angulation of the x-ray assembly. The shaft 29 extending from the yoke (see FIGS. 2, 5, and 7) is associated with and secured to a disc 48 that is rotatable relative to and carried by the vertically-movable first frame 19. Roller bearings 49 shown in FIG. 6 support the basic weight of the rotary assembly, and eight additional bearings 50 shown in FIGS. 5, 6 and 7 provide lateral stability for disc 48. Each lateral bearing 50 is secured to a bracket 51 via an eccentric mounting structure to provide easy and accurate fitting and adjustment. An electric motor 52 is pivotally mounted at 53 with a spring 54 urging the motor's friction drive wheel 55 into contact with the edge of the disc 48. As mentioned above with respect to FIG. 1, and now FIGS. 5 and 7, the remote end of shaft 29 has secured to it coupling 36 for engaging rod 32 of the clutch mechanism.

FIGS. 9 and 10 show schematics of the control handle 56 (also see FIG. 2), and electrical circuit which enable the operator of this apparatus to exercise all controls with only one hand. The three movable frames, vertical, lateral, and longitudinal, each have their magnetic locks 26, 27 and 28 controlled via the relay coils 57, 58 and 59. As shown the switches of $W_3$, $S_1$ and $S_2$ of the corresponding relay coils, are normally closed, such that the three locks 26, 27 and 28 are normally engaged. Only by grasping and maintaining pressure on lock release 60 is switch $W_3$ opened which releases all three magnetic locks. Consequently this provides a safety feature in that these locks become actuated automatically whenever member 60 is no longer held and depressed.

For clockwise rotation of the yoke 15 toggle 61 is pivoted to close the normally open switch $W_1$. This action opens the corresponding relay $S_1$ which releases the vertical, lateral and longitudinal locks, and also starts the electric motor that drives the yoke; for counter-clockwise rotation similar action occurs. The clutch 62 may (i) close switch $W_4$ to activate magnetic locks 35 to restrain the yoke from rotating, or (ii) open switch $W_4$. Also, when switch $W_1$, for example, is closed to cause rotation, the relay coil $S_1$ induces relay switch $S_1$ to open and thus release the vertical, lateral and longitudinal locks. The shape of the handle 56 shown permits operation of the toggle 61 by the operator's thumb, the clutch slide switch 62 by his index finger, and the lock release 60 by his remaining fingers. Also, this control handle has a removable and sterilizable sleeve 63 secured by bolt 64.

A detailed discussion of medical theory or of electrical circuitry relating to any of the x-ray procedures for which the present invention is used, has been omitted, as such is believed to be well-known by persons who use this equipment and readily available in relevant prior art publications. The structural features described above provide a variety of useful and important functions for the medical practice, with numerous structural variations conceivable within the overall concepts of the invention. For example, counter-balancing spring systems may have various configurations; numerous manual and electrical methods are available for moving the different frames and sub-assemblies; and locking means are of many types besides electromagnetic.

What is claimed is:

1. Apparatus for use with x-ray system elements including an x-ray tube and an image intensifier, and for moving this system into selected positions and orientations, the movements being in planes defined relative to a vertical axis, a horizontal-longitudinal axis normal to the vertical axis, and a transverse axis normal to the longitudinal axis, the apparatus comprising: a first frame, a second frame on which the first frame is movable in a vertical plane, a third frame on which the second frame with the first frame is movable in a lateral plane, a base on which the third frame with the second and first frames is movable in a longitudinal plane, a yoke having two spaced arms on which the x-ray tube and intensifier respectively are carried, a shaft rotatably engaging the first frame and having one part secured to said yoke and a remote part, a clutch member which engages the third frame and is rotatable about axes parallel to a horizontal axis in the longitudinal plane, and includes a linear part, the shaft's remote part slidably engaging said clutch linear part, means for locking from further rotation said clutch member in a selected rotary position, whereby said remote part engaged to the clutch is also locked from further rotation and can move only linearly thus defining a selected scanning plane parallel to said horizontal, such that the yoke-shaft sub-assembly when subjected to selected forces longitudinally, laterally and vertically, can move only in said scanning plane according to resultants of said forces.

2. Apparatus according to claim 1 wherein the yoke arms define a plane perpendicular to said scanning plane.

3. Apparatus according to claim 1 wherein said linear part of the clutch means is a rod to which the shaft's remote end is slidably engaged.

4. Apparatus according to claim 1 wherein said locking means comprises at least one electromagnet carried by said clutch member and magnetically engagable to the third frame when energized.

5. Apparatus according to claim 1 further comprising second locking means for selectively locking the first frame relative to the second frame, the second frame relative to the third frame, and the third frame relative to the base.

6. Apparatus according to claim 1 wherein each pair of relatively moving frames has a pair of adjacent surfaces, and the apparatus further comprises low-friction means such as ball-bearings between each pair of adjacent surfaces.

7. Apparatus according to claim 1 further comprising means on the second frame engaging the first frame and counter-balancing the gravity force acting on the first frame and x-ray assembly.

8. Apparatus according to claim 7 wherein said counter-balancing means comprises an assembly of tension springs arranged to provide a substantially constant force tending to lift the first frame regardless of its vertical position.

9. Apparatus according to claim 8 wherein each spring of the counter-balancing means has a first end secured to the second frame and a remote part, the counter-balancing system further comprising a lever with a pivot point at one end, a remote part, and an intermediate point near the pivot forming a short moment arm, the remote part of the spring secured to said intermediate point of the lever, and the first frame engaged to the remote part of the lever, whereby a large vertical movement of the first frame and remote part of the lever, results in an only small movement of the intermediate part of the lever, and a greater increase in moment arm of the lever's remote part than the intermediate part.

10. In an apparatus for use with x-ray system elements including an x-ray tube and an image intensifier on a frame, a base, and means for supporting and moving this system vertically relative to the base, the improvement in combination therewith of means for counter-balancing said system for said vertical movement comprising a tension spring means having a first end fixedly secured to the base and a remote end, a lever having a first part pivotally secured to the base and having a second part remote from the first part, and an intermediate junction part of the lever substantially closer to said first part than to the second part, the remote end of the spring secured to said junction part of the lever and the remote part of the lever engaging the frame for urging same upward, whereby the remote part of the lever describes a much greater arc of movement than the junction part, and movement of the lever's remote part downward defines an increasing length of the moment arm thereof such that the spring has only a small change in length and effective moment arm while the remote part of the lever and the frame have greater displacement and greater increase in moment arm.

11. In an apparatus for use with x-ray system elements for medical treatment and diagnosis including an x-ray tube and image intensifier, and for moving this system into selected positions and orientations relative to a base, the apparatus further including means for rotating the system about a horizontal axis with this axis and the x-ray tube and intensifier defining a first plane, means for moving said plane relative to the base in the mutually perpendicular directions, vertical, longitudinal and transverse, and for restraining same in a selected position and orientation, and means for moving the system only in a scanning plane that is normal to said first plane.

12. Apparatus for supporting an x-ray tube and an image intensifier comprising, a yoke having a horizontally disposed rotatable shaft and two spaced arms with the x-ray tube securable to one arm and the intensifier securable to the other arm, a plane defined by the two arms which plane is pivotable about the horizontal yoke axis therethrough, a first frame on which the yoke is rotatably secured, a second frame on which the first frame and yoke and x-ray system are vertically movable, a third frame on which the second frame and elements carried thereon are laterally (horizontally) movable, a base on which the third frame is longitudinally (horizontal and perpendicular to lateral) movable, and clutch means on the third frame for engaging said rotatable shaft of the yoke and maintaining said engagement in all vertical, lateral and longitudinal positions of the yoke, and for selectively locking said shaft and yoke from rotation in any position and/or orientation of the yoke.

13. Apparatus for counter-balancing a mass which is engaged to and vertically movable relative to a frame, comprising tension spring means having a first end fixedly secured to the frame and a remote end, a lever having a first part pivotally secured to the frame and having a second part remote from the first part, and an intermediate junction part of the lever substantially closer to said first part than to the second part, the remote end of the spring secured to said junction part of the lever and the remote part of the lever engaging the mass for urging same upward, whereby the remote part of the lever describes a much greater arc of movement than the junction part, and movement of the lever's remote part downward defines an increasing length of the moment arm thereof such that the spring has only a small change in length and effective moment arm while the remote part of the lever and the mass have greater displacement and greater increase in moment arm.

* * * * *